US009606654B2

(12) United States Patent
Li

(10) Patent No.: US 9,606,654 B2
(45) Date of Patent: Mar. 28, 2017

(54) ACTIVATED DISPLAY

(71) Applicant: Yongqiang Li, Cupertino, CA (US)

(72) Inventor: Yongqiang Li, Cupertino, CA (US)

(*) Notice: Subject to any disclaimer, the term of this patent is extended or adjusted under 35 U.S.C. 154(b) by 145 days.

(21) Appl. No.: 14/699,392

(22) Filed: Apr. 29, 2015

(65) Prior Publication Data

US 2016/0320871 A1 Nov. 3, 2016

(51) Int. Cl.
*G06F 3/041* (2006.01)
*G06F 1/16* (2006.01)

(52) U.S. Cl.
CPC .............. *G06F 3/041* (2013.01); *G06F 1/163* (2013.01); *G06F 2203/04102* (2013.01)

(58) Field of Classification Search
CPC combination set(s) only.
See application file for complete search history.

(56) References Cited

U.S. PATENT DOCUMENTS

| 6,498,597 | B1 | 12/2002 | Sawano |
| 2006/0209218 | A1* | 9/2006 | Lee ........................... G04G 9/00 349/1 |
| 2010/0188422 | A1 | 7/2010 | Shingai et al. |
| 2011/0187681 | A1* | 8/2011 | Kim ..................... G06F 1/1652 345/204 |
| 2012/0313862 | A1 | 12/2012 | Ko et al. |
| 2013/0155032 | A1 | 6/2013 | Kim |
| 2013/0265262 | A1 | 10/2013 | Jung et al. |
| 2013/0342439 | A1 | 12/2013 | Kwack et al. |
| 2015/0085621 | A1 | 3/2015 | Hong et al. |

OTHER PUBLICATIONS

Zadow et al. "SleeD: Using a Sleeve Display to Interact with Touch-sensitive Display Walls." Interactive Media Lab, Technische Universitat Dresden. Nov. 19, 2014 (Nov. 19, 2014). Retrieved from the Internet at: https://www.iml-dresden.org/cnt/uploads/p129-von-zadow.pdf. Entire document, especially; pp. 130, col. 1.
Search Report for International Application No. PCT/US16/27219 filed Apr. 13, 2016.

* cited by examiner

*Primary Examiner* — Van Chow
(74) *Attorney, Agent, or Firm* — Lempia Summerfield Katz LLC

(57) ABSTRACT

An actuated display may involve a first sensor disposed so as to sense a surface of a body, the first sensor configured to detect a tensing of the body. A second sensor configured to determine an orientation of the body may also be involved. A flexible display screen configured to be hidden in a stored configuration and visible so as to expose a visible screen display area of the flexible display screen in an un-stored configuration, and an actuator configured to cause the flexible display screen to transition between the stored configuration and the un-stored configuration based on signals from the first sensor and second sensor may also be involved.

20 Claims, 10 Drawing Sheets

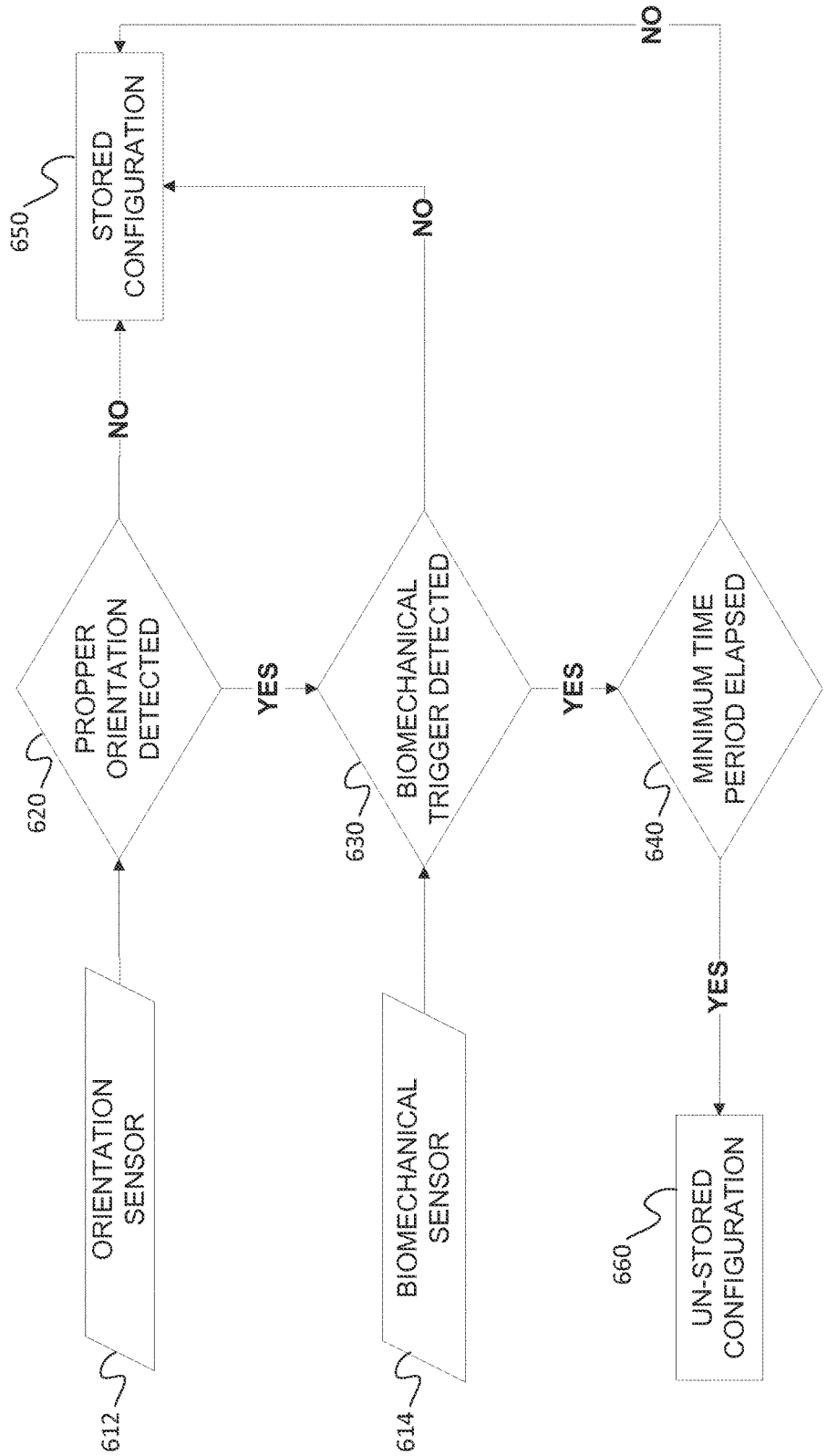

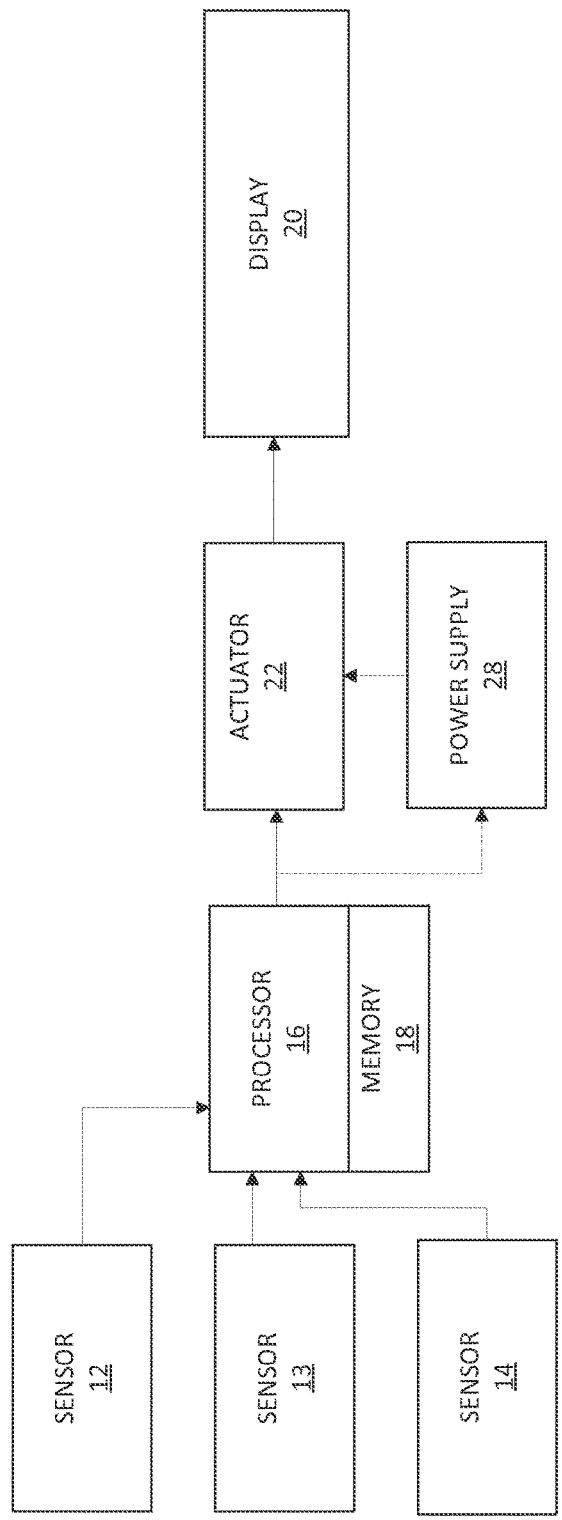

ACTIVATED DISPLAY

TECHNICAL FIELD

The following disclosure generally relates to an activated display and, more particularly, to a display actuated by sensors.

BACKGROUND

People regularly carry one or more mobile computing devices, such as a smart phone, personal digital assistants (PDA), and/or other computing devices. The mobile computing devices communicate with data networks to provide data to the respective users. The information may be consumed by the user through a display of the communicated data. Often, however, the portability of mobile devices limits the access and/or convenience of viewing mobile device displays. For example, a laptop computer may be in connection with a mobile data network, but is too large and cumbersome to operate in a timely and convenient fashion while a user is in transit between destinations. A smart phone may be more convenient to access in such a situation, but a user may not have full use of their hands in order to appropriately orient the display of the smart phone. Another option may involve a smaller mobile device form factor, such as a smart watch, which may provide readily accessible convenience, but tends to have a display with a limited viewing area.

SUMMARY

By way of introduction, the preferred embodiments described below include a method, a system, instructions, and a computer readable media for activating a display in a mobile device. Tensing of a user and orientation or motion of the mobile device are used to activate deployment of a flexible display on the mobile device.

In an embodiment, an apparatus involves a coupler configured to attach to a forearm of a user. The apparatus may also involve a first sensor disposed on the coupler so as to sense a surface of the forearm, the first sensor configured to detect a tensing of the forearm, and a second sensor configured to determine an orientation of the coupler. The apparatus may also involve a screen assembly attached to the coupler. The screen may involve a flexible display screen, a core around which the flexible screen display screen is wound in a stored configuration, and an actuator configured to un-store the flexible screen display, exposing a visible screen display area in response to signals from the first sensor and the second sensor.

In an embodiment, a method involves detecting a tensing of a body with a first sensor, the first sensor attached to a coupler and disposed so as to register with a surface of the body, determining that the coupler is at a specific state of motion and orientation with a second sensor, and extending, in response to the detected tensing of the body and determined specific orientation of the coupler, a flexible display screen away from the coupler exposing a visible display area of the screen.

In an embodiment, a system involves a first sensor disposed so as to sense a surface of a body, the first sensor configured to detect a tensing of the body. The system may also involve a second sensor configured to determine an orientation of the body. The system also involves a flexible display screen configured to be hidden in a stored configuration and visible so as to expose a visible screen display area of the flexible display screen in an un-stored configuration, and an actuator configured to cause the flexible display screen to transition between the stored configuration and the un-stored configuration based on signals from the first sensor and second sensor.

BRIEF DESCRIPTION OF THE DRAWINGS

Exemplary embodiments of the present invention are described herein with reference to the following drawings:

FIG. 6 shows an embodiment of a flow chart for illustrating determination of whether an activated display device should provide a display in a stored or un-stored configuration.

FIG. 8 shows one embodiment of a system for an activated display.

DETAILED DESCRIPTION

Figure 1:
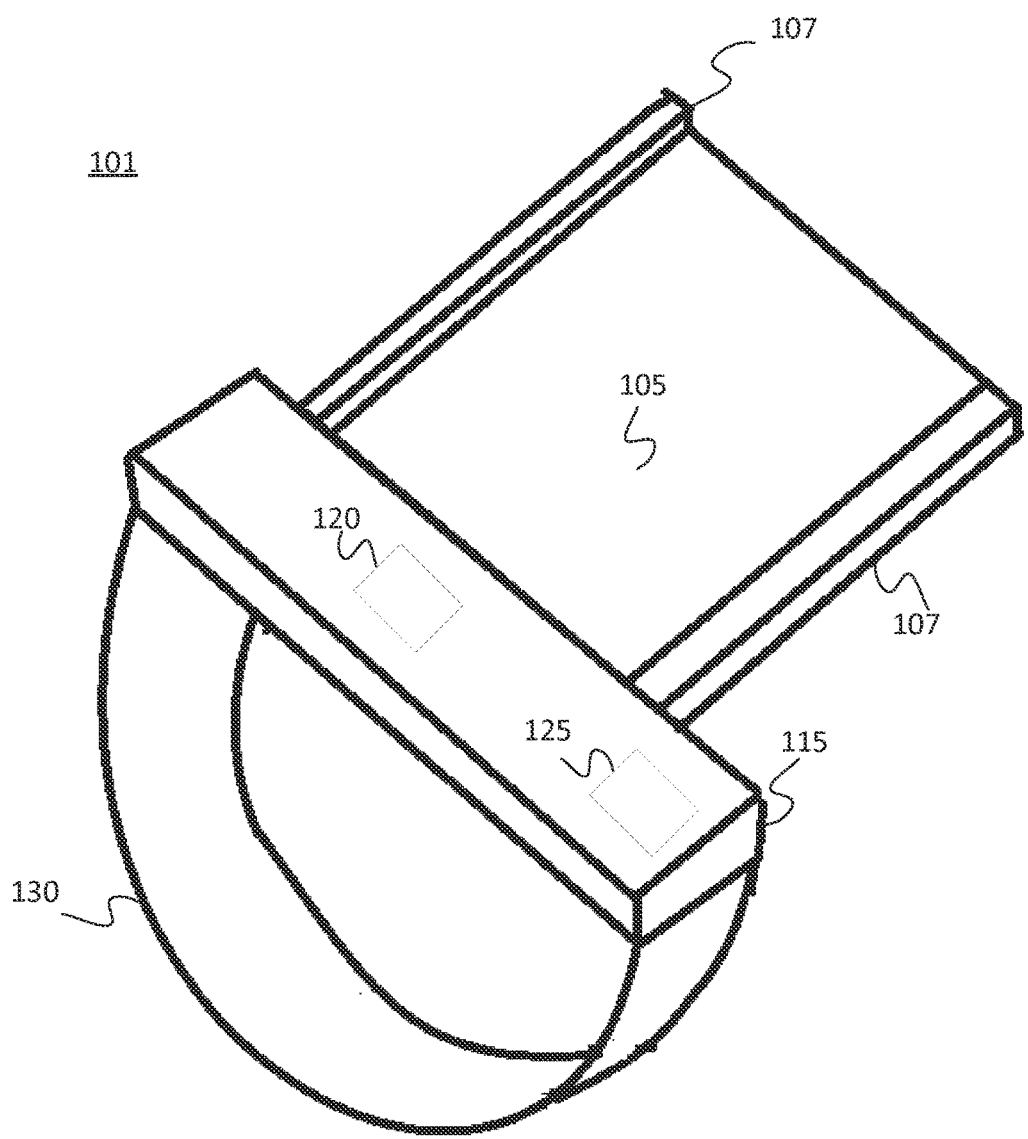
FIG. 1 illustrates an embodiment of an intelligently activated display device.

An intelligently expandable wearable display device may allow for hands-free deployment and retraction. Such a wearable display device may involve a flexible display enclosed in a wrist band, such as a watch band. The display actively responds to the wearer's muscle activity as well as the orientation and/or motion of the wearer's forearm. For example, a combination of such biomechanical, orientation, and/or motion triggers may indicate a user is getting ready to read a book in the palm of a hand, or other actions. These triggers may cause a flexible display to expand from a rolled up configuration into a size and/or shape suitable for displaying, viewing, and/or inputting information. The expanded display may also roll-up or retract into a wrist band when the triggers indicate a different state. Such triggers may involve a palm closing or opening from a fist into a reading posture and/or an arm swinging away from, or into, a reading posture. The display may not expand until triggered by the associated trigger gestures or may be manually activated. Also, the display may be manually retracted and/or extended.

As described further below, the display device may involve a flexible thin film organic light emitting display, such as an electroluminescent film. Electroactive materials may form a frame for the flexible display. When such a frame is charged with a polarity, the frame, along with the contained flexible display, may roll flat or flatter (e.g., unroll at least partially). When such a frame is charged with a second polarity, the frame along with the contained flexible display, rolls-up, or otherwise retracts into a provided enclosure.

Display activating triggers may be detected using various devices. For example, biomechanical triggers may be detected using sensors. The sensors may be embedded in a wrist band to sense or otherwise detect the relaxing, contracting, and/or tensing of muscles and/or tendons in the forearm when a palm unfolds or makes a fist. Also, sensors may detect the orientation and/or motion of the forearm, wrist band, and/or display enclosure to trigger of the active display, such as the deployment and/or retraction of a display.

An intelligent expandable display for a wearable device may involve several characteristics. The dimensions (e.g. length, width, thickness) of flexible display may be configured so as to allow for coupling onto or with an existing watch or wrist bands, as well as integrated into or with watch or wrist bands. For example, an enclosure may be attached to a watch band over a clasp of the watch band. Further, the enclosure may be rotatable for right hand or left hand wearing. More and/or fewer characteristics may be provided.

In an embodiment, a display system may include a combination of sensors and active bending actuators for hands-free operation of the display device. The sensors may be inertial or other sensors to detect device and/or body orientation and may be muscle tension sensors and/or electric current sensors configured so as to detect palm posture. Actuation of the device may be enacted through actuators involving a disposition of ionic polymer metal composite (IPMC) and/or piezoelectric polymers configured for expanding and retracting the display. For example, the actuator may be integrated as the frame of the screen. Other actuators and/or screen frame combinations may also be used.

In an embodiment, a hands-free operation method may involve sensors and actuators configured in a wearable display device. After sensors detect the orientation and/or posture of a human forearm, palm, and/or device housing, a display is expanded or retracted by the application of a voltage or current to the actuators. A combination of an IPMC, piezoelectric and/or bimetallic strip actuator and inertia, orientation, and/or tension or load sensors may be used to effect the operation of the display.

FIG. 1 illustrates an embodiment of an intelligently activated display device 101. A display device 101 includes a flexible display screen 105, at least one actuator 107, a first sensor 120, and a second sensor 125. The display device 101 may also involve a coupler 130 and a display housing 115. The display housing 115 may be configured for storing the flexible screen when it is in a retracted or stored state. Different, additional, or fewer components may be provided. For example, the two sensors 120 and 125 are combined into one sensor. As another example, a user input (e.g., buttons or touch sensor) may be provided. In another example, the display may be a touch sensitive display for providing input and/or interaction with the display device 101.

The flexible display screen 105 may be any type of display operable to provide and/or receive information from a user. The flexible display screen 105 may involve electroluminescent materials formed into a thin film, also known as a thin film electroluminescent (TFEL) device. Any TFEL material and/or technique may be used for the flexible screen display 105, such as Zinc and Sulfur (ZnS) based materials, ZnS doped with Manganese (ZnS:Mn) based materials, powdered zinc doped with copper or silver based materials, and/or any other such materials and material combinations. Also, an organic light emitting diode (OLED) may be used. In an embodiment, the thickness of the flexible display may range from around 0.01 mm to around 0.2 mm. Such material thickness range may provide for the flexibility to allow for rolling the screen 105 into configurations having less than a 10 mm radius while still maintaining the luminescent capabilities and the information display capabilities. Also, a flexible touch sensitive user input interface may be integrated with the screen to enable user inputting information to a computing device via the flexible display/touch input assembly.

As is described further below with respect to FIGS. 2A and 2B, the flexible display screen may be secured to the device using a screen assembly attachment 270. Such a screen assembly attachment provides a rigid base in which actuation (e.g. rolling and un-rolling) may be achieved using the actuator 107.

The actuator 107 may be any actuator operable to extend and/or retract the flexible display screen 105. For example, the actuator may be an electric motor that is coupled with a structural frame of the flexible screen display 105. Other actuators may be used as well.

In an embodiment, the structural frame may be constructed of electroactive materials, such as a piezoelectric polymer film (PVDF) or IPMC. Such electroactive materials may be rigid enough to provide structure to the flexible screen display 105. As described further below with respect to FIGS. 3A and 3C the frame may be attached to the edges of the flexible screen display 105. The frame may be attached on the top and bottom of the screen display 105, or surround the edges of the flexible screen display 105. The frame may attach to a rigid core, as shown in FIGS. 2A and 2B, thus forming a rigid outline frame for the flexible screen display 105 when the frame is attached to the device at the screen assembly attachment. Also, rigid cross beams connecting the two edges of the frame formed by the electroactive materials may maintain separation of the two edges producing the flexible screen display in a flat position. Also, guides attached to a device housing may be used to guide the edge frame formed on the two edges of the flexible screen display 105. The guidance may allow or maintain for a linear un-rolling of the flexible screen display 105.

A structural frame that includes electroactive materials such as a piezoelectric polymer film may also operate as the actuator 107. One such piezoelectric polymer film is a polyvinylidene fluoride film which may be configured to expand in a direction when subjected to a charge having a polarity, and configured to retract in the direction when subjected to another charge having an opposing polarity. Such a material configuration may involve a length that is substantially longer than a width or thickness, and the material may expand or contract uniformly in the length direction in response to polarities applied from the width or thickness direction. For example, the material of the actuator 107 may exist in a rolled configuration when subjected to a first polarity, and an extended or straight configuration when subjected to a second polarity. Alternatively, the material of the actuator 107 may exist in a rolled or unrolled configuration when there is no charge applied, and in an extended or straight or rolled, respectively, configuration when a charge is applied to the material. Such an actuator may then be configured to be in a rolled, or stored, state within a housing 115 of the display device 101 when the actuator 107 is subjected to a first charged state, and in an un-stored or extended state when the actuator 107 is subjected to a different charged state. When in the un-stored or extended state, the flexible display may provide a visible area for information presentation. Other actuators may be used as well, such as an electric motor coupled with a spindle to roll and un-roll the flexible display.

Sensors 120, 125 may be used to determine when to actuate the actuator. For example, sensor 120, 125 readings and/or outputs may be used to determine in which state the actuator 107 should present the flexible display screen 105. The sensors may be disposed and/or configured so as to sense any type of input. Further, one singular sensor may be composed of multiple sub-sensors configured to detect the appropriate input and provide the sensor output.

The sensor 120 may be configured to sense a biomechanical input. A biomechanical input may be the tensing of a muscle group, tendon, other body part, or combinations thereof, of a wearer or user of the device 101. For example, the sensor 120 may involve strain gauges and/or strain gauge arrays such as a micro-strain gauge sensor array oriented to sense the surface of a user's body, such as measuring a strain exhibited upon a structure that makes contact with the user's skin. The strain may be caused by body parts under the skin while undergoing tensing or un-tensing. Other biomechanical sensors may also be used, such as a muscle electrical activity sensor. Such a structure may be placed on a surface of the housing 115 or the coupler 130 so as to be in contact with the user's skin. Tensing and/or un-tensing of the biomechanical body components of the user, such as muscles and/or tendons, may be sensed using this configuration. Optical sensing may be used to detect an amount or change in curvature of the skin or the coupler 130. Electric field or optical sensing may be used to detect movement of the user or parts of the user (e.g., one or more fingers).

In an embodiment, the sensor 120 may be placed in contact with the user's forearm so as to detect a tensioning/un-tensioning of the forearm. In another embodiment, muscle activity and/or movement of fingers is detected and/or tracked, for example using muscle electrical activity sensors. Also, micro electro-mechanical systems (MEMS)-based inertia measurement units may be used to detect and/or track biomechanical inputs involving movement of body parts.

The sensor 125 may be configured to determine an orientation of an attached body, the coupler, and/or the display device 101. The sensor may determine the orientation using any technique and/or device. For example, gyroscopes or (MEMS)-based inertia measurement units, such as accelerometer based measurement units, may be used. In an embodiment, the sensor 125 may be placed within the display device so as to detect an orientation of the forearm of the user. For example, the sensor 125 may be placed within, or attached to, the housing 215 as described below with respect to FIGS. 2A and 2B. Also, the sensor 125 may be attached to, or otherwise integrated with the coupler 130.

In an embodiment, a singular sensor 120 or 125 may be used to determine both orientation and a biomechanical input. For example, a MEMS-based sensor may detect orientation and a biomechanical input.

Other sensors may also be used to determine triggers for actuation. For example, motion sensors may be used to determine a motion of a body. In an embodiment, a third sensor may sense motion of a part of a user's body, such as a forearm. Activation of the actuator may also be triggered by signals from the motion sensor.

The coupler 130 may be any coupler operable to provide a secure attachment of the display device 101 to a body. Such attachment may include a respective strap configured to secure the housing 115 to a body such as a wrist or forearm of a user. The housing 115 may be securely attached to such a strap, or may be detachable from such a strap. The strap may be adjustable and may include sections with complementary hook-and-loop or other fasteners at or near ends of the straps to be engaged once the strap is wrapped around the body. The strap alternatively or additionally may include fasteners in the form of buckles, snap-fit connectors, rings, and/or other bindings. The strap may be made of any material, such as leather, metal, plastic, or other materials.

The strap may also include modular battery units that supply electrical power to the active display device 101. Such battery units may be interconnected so as to produce the power required for actuation and/or other operations of the display device 101. In an embodiment the coupler 130 may be a band of a wristwatch. In another embodiment, the coupler 130 may be a wristband dedicated to securing the display device 101 to a wrist of a user.

Figure 2A:
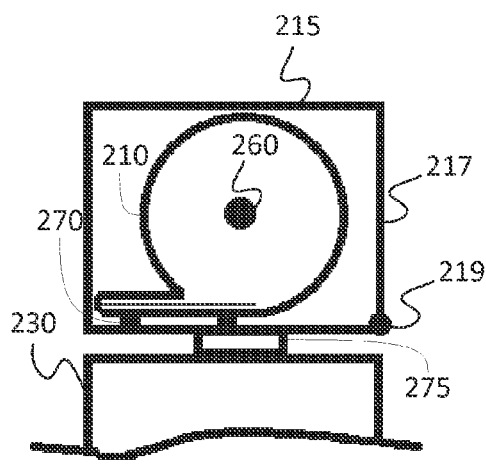
FIGS. 2A-2B illustrate an embodiment of a screen assembly and housing for an activated display device.
Figure 2B:
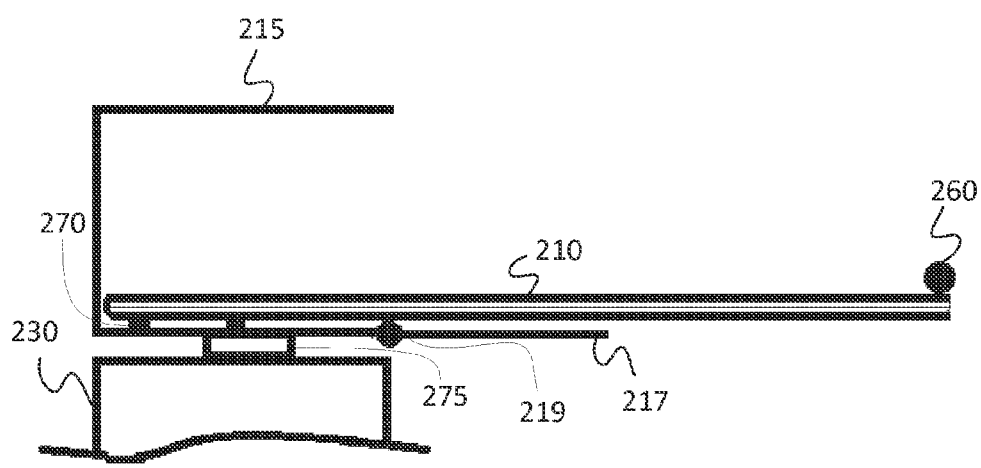

FIGS. 2A and 2B illustrate an embodiment of a screen assembly 210 and housing 215 for an activated display device. FIG. 2A shows the screen assembly 210 in a rolled or stored state. FIG. 2B shows the screen assembly 210 in an un-rolled, un-stored, or extended state.

The screen assembly 210 includes a flexible display screen that can be rolled as shown in FIG. 2A, and un-rolled as shown in FIG. 2B. The screen assembly 210 also includes an actuator that is configured to un-store or un-roll the flexible display screen. The actuator may be configured to un-store the flexible screen display so as to expose a visible screen display area. This un-storing, unrolling, or exposing may be in response to signals received from sensors detecting biomechanical triggers and/or orientations of a body or an activated display device.

The screen assembly 210 may also include a core 260, around which the flexible screen display screen is wound in the stored or rolled configuration. The core 260 may be made of any material and attached to the flexible screen display. The core 260 may be shaped and/or otherwise configured to be grasped by a user to maintain a flat or straight configuration in the un-rolled or un-stored state. As illustrated in FIG. 2A, the core 260 may be contained within a housing 215 in a stored state. In another embodiment, the core 260 may exist outside the housing 215 in a stored state. If a core 260 exists outside the housing 215 in the stored state, the core 260 may be graspable by a user to manually activate the screen assembly 210.

As shown in FIGS. 2A and 2B, the activated display device may also include a housing 215 in which the screen assembly 210 may be stored. The housing 215 may be any enclosure or structure operable to contain the screen assembly 210. The housing may include an attachment or mounting 270 to the screen assembly 210. The attachment 270 maintains a fixed position of the screen assembly 210 within the housing 215. The attachment 270 may also include electrical and/or data communication devices to provide signals to the actuator of the screen assembly 210 so as to trigger actuation of the actuator and/or for the provision of information content to display.

The housing 215 may include a door 217 which may open to facilitate the transition of the screen assembly 210 from a stored state inside the housing 215, as shown in FIG. 2A, to an un-stored state wherein the screen assembly 210 extends from the housing 215. The door may be attached using a hinge 219. The door 217 may open and/or close automatically. For example, the door and/or hinge 219 may be coupled with a spring such that the door is in a closed position (FIG. 2A) when there are no forces being exerted on the door by the screen assembly 210. The spring force of the spring may be selected such that it is less than a force exerted by the actuator upon actuation of the screen assembly 210 (FIG. 2B). In this manner, the door may automatically open and close based on the existent state of the screen assembly.

The housing 215 may also include a mounting device 275 that provides attachment between the housing 215 and a body attachment device 230, such as a wrist band. The mounting device 275 may allow for rotation of the housing 215 into various positions relative to the body attachment device 230. For example, the mounting device 275 may allow for the housing 215 to rotate relative to wrist band attachment device 230 such that the screen assembly 210 extends from the wrist to the hand of a user, whether worn on the right or left hand of the user. For example, the screen assembly 210 may extend into either the right or left palm of a user. In an embodiment, the housing 215 may rotate and be positionable in any position throughout 180 degrees of rotation. Alternatively, the orientation of the housing 215 is fixed relative to the body attachment device 230. The mounting device 275 may also provide electrical connections between the active display and a wrist band in an embodiment where the wrist band encloses a series of modular battery units.

In an embodiment, any combination of the housing 215, the body attachment device 230, the mounting device 275, and the screen assembly attachment 270 may be considered a coupler. For example, the housing 215 may be considered a part of the coupler, or the housing 215 may be considered a separate component from the coupler. In an embodiment, the coupler may be merely the body attachment device 230.

Figure 3A:
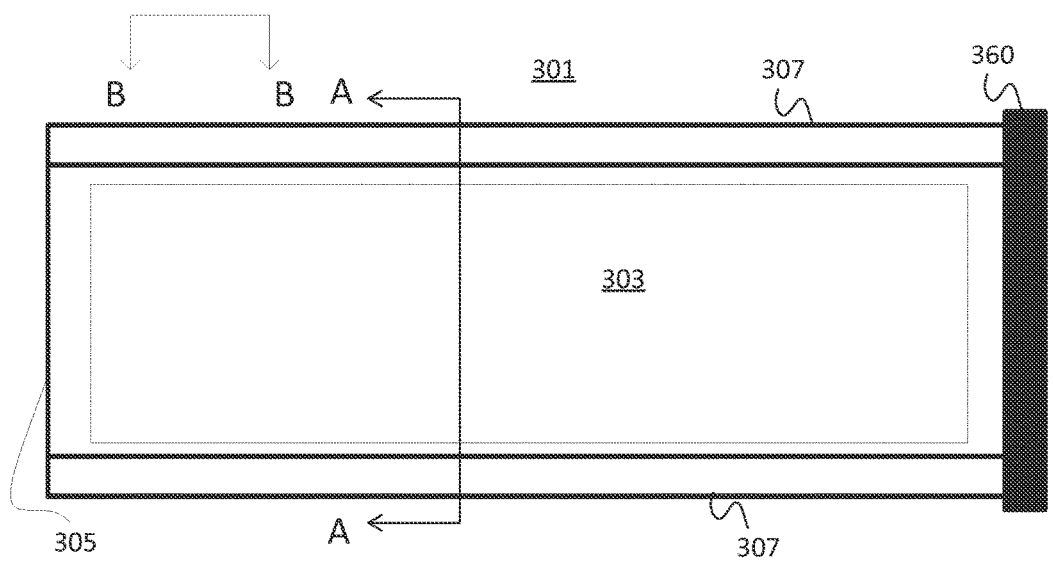
FIGS. 3A-3F illustrate an embodiment of a screen assembly for an activated display device.

FIG. 3A illustrates an embodiment of a screen assembly 301 for an activated display device. The screen assembly 301 includes an actuator 307, a flexible screen display 305 and a core 360. The actuator 307 may form a structural frame for the flexible screen display 305. The actuator 307 may be made of electroactive strips along the edges of the flexible screen display 305. The electroactive strips may be attached to the flexible screen display 305 using any technique. For example the electroactive strips may be bonded to the flexible screen display 305 using an adhesive.

Also, the flexible screen display 305 may be constructed of a flexible thin film organic light emitting display such as an electro-luminance film. The flexible screen display 305 may include a visible screen display area 303. The visible screen display area is operable to project, provide, or otherwise display or receive information to or from a user. Outside the visible area, a material different from a material used in the visible area may be used. The different materials may be joined together in using any technique to form the flexible screen display 305.

Figure 3B:
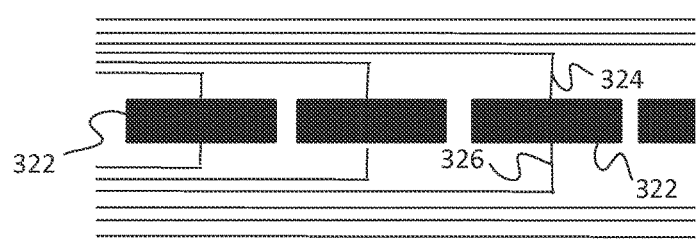
Figure 3C:
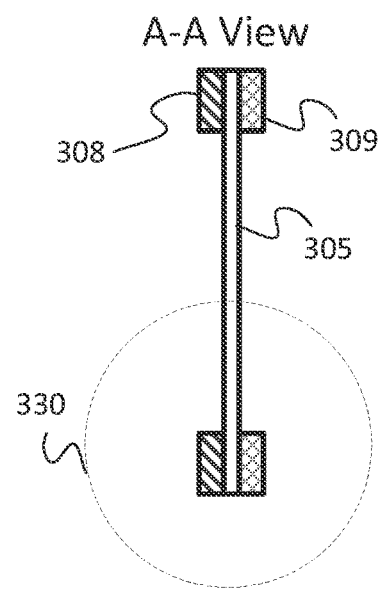
Figure 3D:
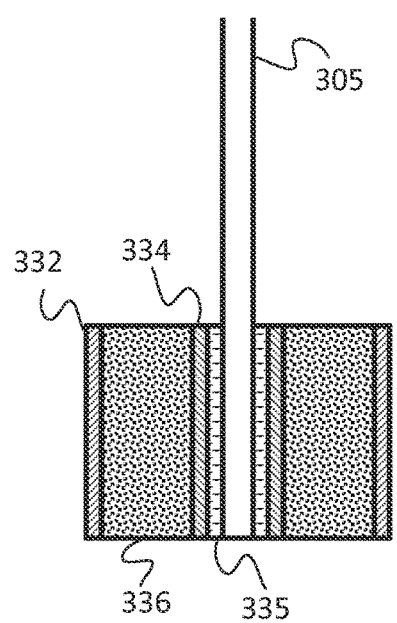

FIG. 3B illustrates a schematic diagram of an embodiment where the electroactive strips involve arrays of independent electrodes 322. Details about the relation between the electroactive strip and the electrodes are shown in FIG. 3C and FIG. 3D and described in the next paragraphs. Each of the independent electrodes 322 may involve the application of a polarity or charge through the connections 324, 326. The connections 324, 326 may be any connections, such as connections implemented as printed circuit connections, or using other techniques or configurations. The polarity or charge provided through the connections may be controlled using a microprocessor and/or other circuitry. For example, the circuitry may provide that a negative polarity is applied through one connection 324, and a positive polarity is applied through the other connection 326. When the electrodes 322 are provided a particular polarity at the same time, the display may bend to a smaller radius than when only one pair of continuous electrodes on each edge of the display is used. Also, a configuration of arrayed independent electrodes allows for the display to extend to multiple intermediate lengths or shapes between fully extended and fully retracted.

FIG. 3C illustrates a cross section view of an embodiment of the screen assembly 301 shown in FIG. 3A at location A-A. In FIG. 3C the flexible screen display 305 is bonded to two sets of electroactive strips 308, 309 at the edges of the flexible screen display 305. The two sets of electroactive strips 308, 309 may be considered the actuator 307. The two sets of electroactive strips 308, 309 may be made of the same or different electroactive materials or have the same or different mechanical and/or electroactive properties.

In an embodiment, the electroactive strips are made of piezoelectric materials (e.g. PVDF). In this embodiment, when a voltage polarity is applied across the thickness direction of one or both of the electroactive strip sets 308, 309, (e.g. via coated electrodes illustrated in FIG. 3D), the different material properties or different orientation of polarities, in the two strips may cause a different orientation or a different amount of deformation. For example, the different polarities may cause a contraction or extension primarily in the length direction of each of the two sets of electroactive strips 308, 309. Thus, in an embodiment where the electroactive strips 308, 309 are piezoelectric, it is this difference in deformation between the strips that may cause the screen assembly 301 to roll around the core 360.

In another embodiment, when the electroactive strips are made of IPMC, a same voltage or polarity may be applied across the thickness of the strips, causing the strips to bend. In such an embodiment, this material bending may cause the screen assembly to roll around the core.

When the voltage or polarity is removed, reversed and/or otherwise changed, the screen assembly 301 is rolled flat by these strips, such as by being extended into the flat position shown in FIG. 3A. In an embodiment, the two sets of electroactive strips 308, 309 may be used as an active and/or non-active pair. For example, a rolled state may be achieved by activating one set of strips 308 and leaving the other set of strips 309 inactive. An extended state may then be achieved by activating the other set of strips 309 and leaving one set of strips 308 inactive. In an embodiment, only one set of the electroactive strips 308 or 309 are used, and the mechanical configuration (e.g. shape or elastic properties) of the material facilitates the achieving of rolled and/or un-rolled states.

FIG. 3D illustrates an embodiment involving a laminar assembly of electrodes, as viewed at the cross section area 330 of FIG. 3C. The laminar assembly involves a first electrode 332 in contact with the electroactive material 336. The electroactive material 336 is also in contact with a second electrode 334. In this embodiment, electrode 334 is attached to the flexible display screen 305 with an adhesive 335. The same construction of electrode-electroactive material-electrode laminar layers may be attached on the second side of the flexible screen 305 display. In an embodiment, the electrodes 332, 334 may be arranged as an array of individual electrodes, as is indicated in FIG. 3B. Singular, continuous electrodes may also be used.

Figure 3E:
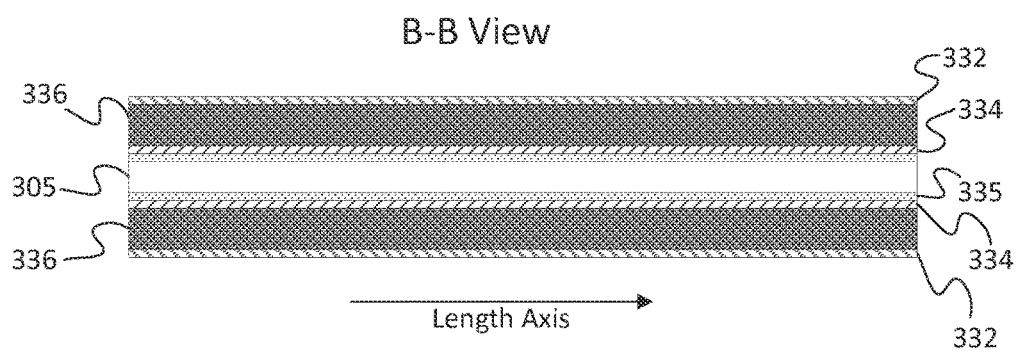

FIG. 3E illustrates an embodiment involving a laminar assembly of electrodes, as viewed from a top view of FIG. 3A at location B-B. This embodiment involves an electrode-electroactive material-electrode laminar construction on both sides of the flexible screen display 305. Each attached with an adhesive 335 on either side of the flexible screen display 305. In this embodiment, the electroactive material 336 may be PVDF. A PVDF electroactive material 336 may be configured so as to expand or contract along the length axis when subjected to voltages from the electrodes 332, 334. This expansion and/or contraction causes the screen assembly to un-store or extend and/or to retract or store. For example, a difference in the degree and/or orientation of the expansion and/or contraction between the electroactive materials on the two sides of the flexible screen display may cause the screen assembly to un-store or extend and/or to retract or store.

Figure 3F:
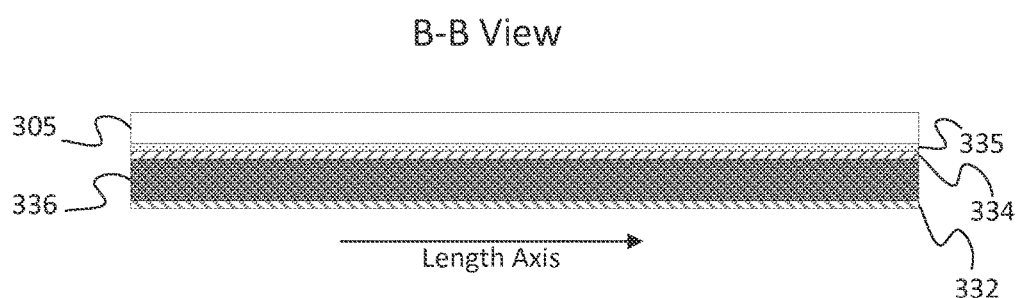

FIG. 3F illustrates another embodiment involving a laminar assembly of electrodes, as viewed from a top view of FIG. 3A at location B-B. This embodiment involves an electrode-electroactive material-electrode laminar construction on one side of the flexible screen display 305. In this embodiment, the electroactive material 336 may be IPMC. An IPMC electroactive material 336 may be configured so as to bend or curve along the length axis in response to voltages from the electrodes 332, 334. For example, metal ions of the IPMC material may move towards a negative polarity electrode 332 causing the areas of the IPMC material closest to the electrode 332 to expand, and thus causing the screen assembly to curve, curl, and/or roll out of a plane parallel with the length axis. This type of curving, curling, and/or rolling causes the screen assembly to un-store or extend and/or to retract or store.

Figure 4:
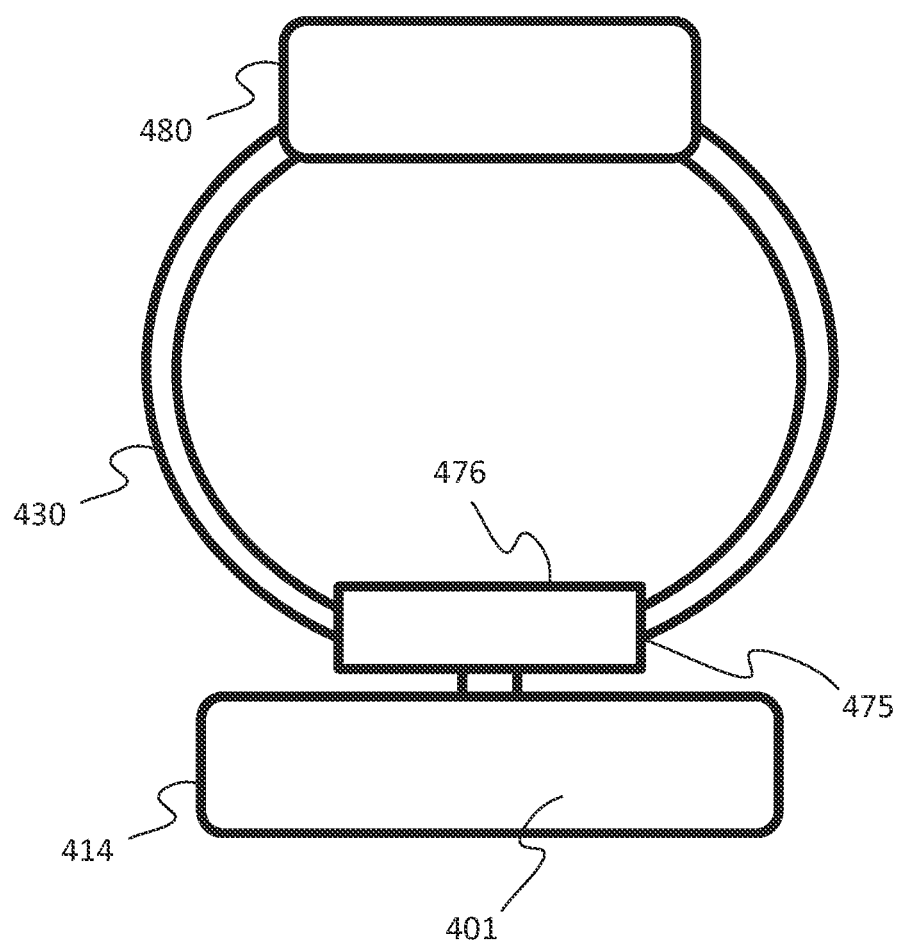
FIG. 4 illustrates an embodiment involving an activated display device configured to attach to an existing watch.

FIG. 4 illustrates an embodiment involving an activated display device 401 configured to attach to an existing watch 430 through the implementation of a coupler 475 configured to fit over the watch band 430. The activated display device 401 may be installed anywhere on the watch band, or the coupler may be configured to attach on the side opposite to the watch 480. The coupler 475 may attach to the watch band 430 using any technique. In an embodiment, the coupler 475 has a slot and/or groove formed into the coupler so as to fit over the watch band 430 and provide a surface 476 which may contact the surface of a forearm of a user. Sensors may be disposed so as to sense biometric triggers at this surface 476. For example, strain gauges may be placed at this surface 476 so as to sense a tensing, or a tensed state, of a forearm of a user wearing the watch 480.

In an embodiment, sensors may be disposed so as to sense biometric triggers at a surface similar to the surface 476 shown that exists in an activated display device that is fully integrated with a watch band, and not implemented as a separate attachment.

Figure 5A:
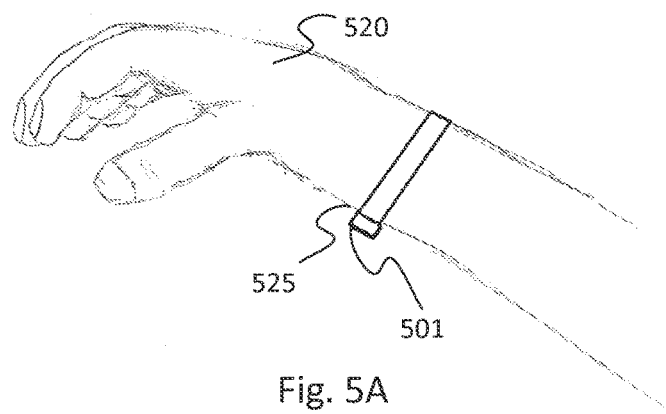
FIGS. 5A-5C illustrate various states of actuation for an embodiment of an activated display device.
Figure 5B:
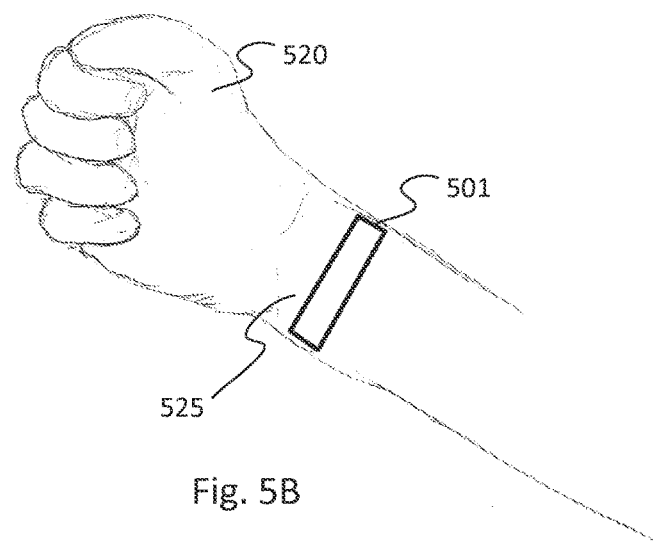
Figure 5C:
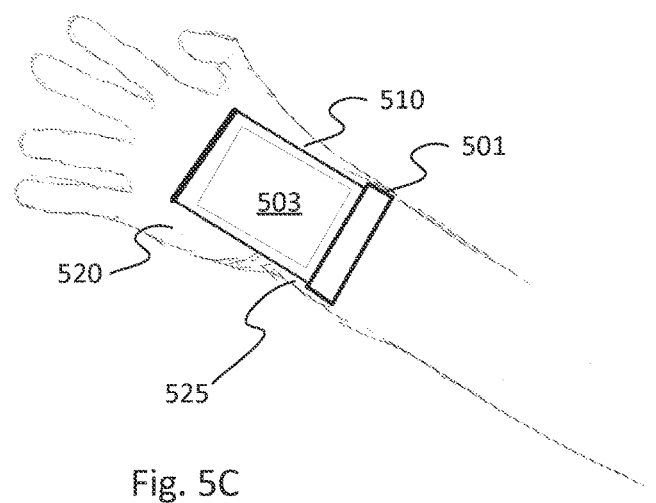

FIGS. 5A-C illustrate various states of actuation for an embodiment of an activated display device 501 configured to be worn on a wrist and/or forearm of a user.

The activated display device 501 may include a specific combination of triggers for activation. For example, a posture of a hand 520 may be a trigger for activation. Forming a hand into a fist and/or leaving a hand open may be postures that provide triggers. In an embodiment, a closed fist, as shown in FIG. 5B, may not be a trigger to activate, or un-store a screen assembly of the activated display device 501, but may be a trigger to store the screen assembly. In an embodiment, a biomechanical sensor may be positioned so as to sense the anterior of a forearm 525 of a user. Such a biomechanical sensor may be a strain gauge in contact with, or otherwise positioned to sense, the surface of the forearm 525 so as to determine a tensing of the forearm as caused by a hand in a closed fist posture, and a hand in an open posture.

An orientation of the activated display device 501, or body part of a user, may also be a trigger for activation. For example, the activated display device 501 may be coupled with the wrist of a user, as is shown in FIGS. 5A-5C. As a user turns the wrist, the device 501 will also turn as the orientation of the wrist changes. As such, a specific orientation of a wrist of a user is determined based on an orientation sensor included in the activated display device 501. A specific orientation corresponding to a posture of the wrist wherein the anterior of the forearm is viewable to a user can be determined. Such a reading posture may be a trigger for activation of the activated display device 501.

A specific combination of triggers may be used to activate the activated display device 501 in an appropriate manner. For example, as shown in FIG. 5C, a detected open hand combined with a determined reading posture orientation may cause the activated display device 501 to extend a flexible display screen 510 linearly away from the device 501 exposing a visible display area 503 of the screen 510. In an embodiment, the display device 501 may expand in different increments or configurations in response to detection of the manipulation of different fingers, or combinations thereof, by the biomechanical sensors. If one of the triggers is absent, such as the reading posture orientation absent in FIG. 5A or the open hand posture absent in FIG. 5B, the activated display device 501 maintains a screen assembly in a stored state. Other triggers may also be used in combination with, or in place of, the triggers described above. For example, motion of the forearm may be used. Also, triggers may be held for a determined length of time to actuate the activated display device. For example, any, or all, the required triggers may be detected for period of time, such as 0.5 seconds, prior to activation. Other combinations include repetitive sensing, such as sensing a combination of tensing and un-tensing over a period. The user activates, in part, by tensing and un-tensing in a pattern. Similarly or additionally, combinations of motion may be used.

Determination for whether a flexible screen display 510 is to be activated such that it is displayed in a stored or un-stored configuration involves a collection of data indicative of triggers from sensors as well as a particular arrangement and logic allowing for such determinations, for example, as is shown in FIG. 6.

FIG. 6 shows a flow chart for an embodiment illustrating an example determination of whether an activated display device should provide a flexible display screen in a stored or un-stored configuration. As presented in the following sections, the acts may be performed using any combination of the components indicated in FIG. 8. For example, the processor 16 may perform the acts. Also, the processor 16 may be coupled with the other components described with respect to FIG. 8 to carry out the acts. For example, the processor may detect a proper orientation using one or both of the sensors 12, 14. Additional, different, or fewer acts may be provided. For example, determining whether a minimum time period elapsed as shown in act 640 may be omitted. The acts are performed in the order shown or other orders. For example, act 620 may occur after act 630. The acts may also be repeated.

In act 620, orientation or change in orientation is detected. The detection is made from data provided by an orientation sensor 612. The orientation is of a body, body part of a user, and/or a screen display device. The orientation detection may include detected movement or motion, such as a movement or motion resulting in the orientation. A proper orientation may be determined as an orientation allowing for viewing of a flexible screen display of the screen display device by a user of the screen display device. For example, an elevated wrist turned towards the user, as shown in FIG. 5C, indicates a desire to consume information from, or interact with, the display. As indicated in FIG. 6, if a proper orientation is detected, further data may be used to progress towards an un-stored configuration 660. If the proper orientation is not detected, the display device remains in the stored configuration 650.

In act 630, one or more biomechanical triggers are detected. Biomechanical triggers are events and/or states of the body of a user of the display device, such as a tensing and/or movement of a forearm as caused by positioning an open hand in a reading posture. One or more than one biomechanical triggers may be detected. The detection is made from data provided by a biomechanical sensor 614. As indicated in FIG. 6, if a biomechanical trigger is detected, further data may be used to progress towards an un-stored configuration 660. If the biomechanical trigger is not detected, the display device remains in the stored configuration 650.

In act 640, an elapsed time of detected trigger existence is determined. An elapsed time of trigger existence may be a measured time data indicating the existence of the trigger provided by the sensors 612, 614. This elapsed time may be compared to an established or predetermined period of time for trigger existence, such as 0.5 seconds. If the elapsed time is greater than, or equal to, the predetermined time period, the triggers may be considered adequate to enable an un-stored configuration 660 of the display device. If both triggers are active for less than the time period, the device may remain in a stored configuration 650. All triggers may be required to be active for or within a same time period, or there may be different time periods for each trigger. Also, a time period may be measured beginning at the moment when all required triggers are active, or measured from other points in time.

In an embodiment, each of the proper orientation detection 620, the biomechanical trigger detection 630, and the minimum time period elapsing 640 must be in a "YES" state for the activated display to provide a display in an un-stored configuration 650. In this embodiment, if any act 620, 630, 640 results in a "No" state, the display will remain in the stored configuration 660. Further, a removal of a trigger, such as the proper orientation detection 620, may trigger the activated display to provide the display in the stored state. For example, a user may lower and/or turn the forearm away from a reading posture. Other biomechanical triggers and/or orientation triggers may be used to store the display as well, such as movement of fingers and/or closing of the hand as shown in FIG. 5B. Also, a manual switch may be provided to override the control logic of the display.

Figure 7:
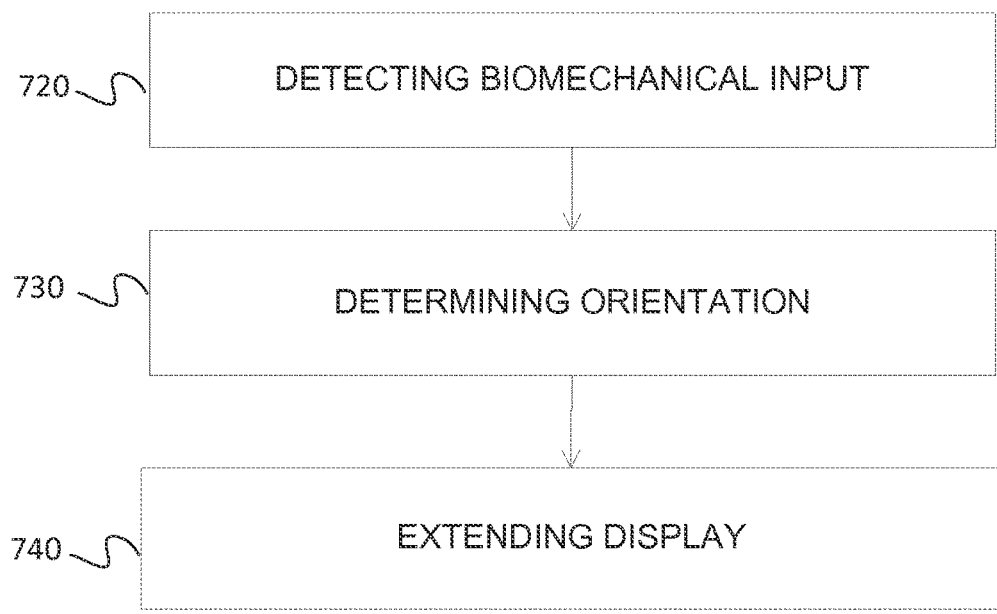
FIG. 7 shows a flowchart of an embodiment for employing an actuated display.

An embodiment of a method for employing an actuated display is shown in FIG. 7. The method may be implemented with any combination of the components as described below with respect to FIG. 8 or above with respect to FIG. 1. For example, detecting biomechanical input of act 720 may be performed by the processor 16 using data provided by a sensor 12, 14. More or fewer acts may be provided. For example, only the determining an orientation of act 730 may be provided. Also, a manual trigger may be detected. The acts occur in the order shown or a different order. For example, the detecting biomechanical input of act 720 may occur after or at a same time as orientation determination of act 730.

In act 720, biomechanical input is detected. The biomechanical input may be any movement and/or state determination of a body part of a user. In an embodiment, biomechanical input is received as a detecting a tensing of a body with a first sensor. The tensing may be a tension level of a forearm of a user as is commensurate with a detected posture of a hand of a user. The tensing may be detected using strain gauge sensors placed in contact with the users forearm. For example, the first sensor may be attached to a coupler on a wrist of a user, and disposed so as to register with a surface of the forearm of the user. By sensing this surface, a tension level of the forearm indicative of an open hand (un-tensed) and/or closed hand (tensed) may be sensed and/or detected.

In an embodiment, a biomechanical input may be a motion of a body, as may be detected using accelerometers or other motion detecting sensors. Further, a lack of motion in a body part may be considered a biomechanical input.

In act 730, an orientation is determined. The orientation may be an orientation of a body part of a user, an orientation of an actuated display device, or other orientations appropriate for the actuation of a display for consuming and/or providing information. The orientation may be the orientation of a forearm of a user. For example, the display device may be attached to the wrist of a user such that the device is positioned on the anterior of the forearm of the user. Positioning the anterior of the forearm of the user towards the user's face, such as in a reading posture if a user were holding a book in their hand, would be an orientation that may be detected. This orientation may be considered a proper orientation for consuming information from a flexible display screen of the actuated display device. This orientation may be determined using an appropriately configured sensor, such as a gyroscope, installed in the actuated display device. Any sensor operable to determine an orientation may be used. For example, sensors including MEMS-based inertia measurement units, such as accelerometer based measurement units, may be used.

In act 740, a display is extended. The display is extended based on the detected biomechanical input of act 720 and the determined orientation of act 730. The display may be a flexible display that is stored in a rolled state and extended from the rolled state to a flat state, thereon displaying a visible display area. Content may be displayed on the visible display area.

The display may be extended using any technique. In an embodiment, an actuator is attached to the display so as to extend the display from a stored state. For example, an actuator may involve the attachment of electroactive material strips to a flexible display. Subjecting the electroactive material strips to a first polarity may cause the strip-display assembly to un-roll or extend. Subjecting the electroactive material strips to a second polarity, or alternatively a lack of charged energy, may result in the strip-display assembly being in a stored, rolled, or un-extended position.

In an embodiment, the display may also be deployed incrementally and/or into different states based on different detected movements and/or orientations. For example a state may involve a fully stored state in response to a detected fist, a quarter extended state in response to a detected extended thumb, a half extended state in response to a detected thumb and index finger extension, and/or a fully extended state in response to a detected open hand. The extension state may be controlled using incrementally changing levels of polarity applied to arrays of individual electrodes attached to electroactive material. For example, some of the individual electrodes may be provided a polarity or charge, and other individual electrodes may not be provided a polarity or charge, depending on a desired extension configuration.

In an embodiment, the display may be recalled, or re-rolled, into the stored position upon detection of other biomechanical inputs and/or orientations. For example, as is shown in FIGS. 5A and 5B, a closed hand biomechanical input and/or turned down anterior of a forearm orientation may trigger the re-rolling or storing of the display.

FIG. 8 shows one embodiment of a system for an activated display. The system implements the methods of FIGS. 6 and/or 7, or other methods. Additional or fewer components may be included in the system. For example, the system may have only one sensor 12.

The system includes sensors 12, 13, 14, a processor 16, a memory 18, a display 20, an actuator 22, and a power supply 28. In one embodiment, the system is a computer, a mobile computer, or other mobile device. For example, the system may be integrated with a coupling device, such as a wristband of a watch. The processor 16, memory 18, and display 20 may be a standalone device or connected to a wired or wireless computer network. Additional, different, or fewer components may be provided. For example, additional sensors 12, 13, 14 are provided. As another example, the sensors 12, 13, 14 are not provided and the system further includes a manual activation switch for the display 20. In another embodiment, both the sensors 12, 13, 14, and a manual activation switch are included in the system.

Each sensor 12, 13, 14 senses one or more input triggers and provides data indicative of the trigger. The sensors 12, 13, 14 may be configured to detect biomechanical triggers and/or orientation triggers. More sensors may also be used.

The processor 16 accesses the sensor data from the sensors 12, 13, 14 as needed or to aggregate for activating the display 20. The processor 16 is configured by hardware and/or software to identify values and/or other data indicative of inputs meeting criteria for display activation and/or deactivation.

The sensors 12, 13, 14 may store data on the same or different memories. For example, a sensor 12 may provide and/or generate data to store on memory 18. The sensors 12, 13, 14 may provide sensor data directly to the processor for display 20 activation determinations, and/or the data may be stored on the memory 18 and read by the processor 16 from the memory.

The processor 16 is a hardware device with processing implemented in various forms of hardware, software, firmware, special purpose processors, or a combination thereof. A circuit, application specific integrated circuit, digital signal processor, general processor, or other processor may be used. Some embodiments are implemented in software as a program tangibly embodied on a program storage device (e.g., the memory 18). The processor 16 may be a computer, personal computer, mobile computing device, or other now known or later developed processing system. The processor 16 may be operatively coupled to other components, such as the memory 18 and the display 20. The processor 16 is implemented on a computer platform having hardware components. The other components may include the memory 18, a network interface, an external storage, an input/output interface, the display 20, and/or a user input. Additional, different, or fewer components may be provided. The computer platform may also include an operating system and microinstruction code. The various processes, methods, acts, and functions described herein may be part of the microinstruction code or part of a program (or combination thereof) which is executed via the operating system.

The display 20 is a flexible display made of an electroluminescent film capable of bending to a small radius (e.g. a radius small than 10 mm), or other output device for showing data.

The actuator 22 is any device operable to be controlled by the processor 16 to extend and/or retract the display 20. The actuator may be made of electroactive materials including piezoelectric polymer films, such as polyvinylidene fluoride. For example, the electroactive materials may form a frame for the display 20. As such, the actuator may be enacted through provision of a charge to the electroactive materials so as to change the state (e.g. expand or contract) of the electroactive materials. Ionic polymer metal composites, such as Nafion with metallic plating or other ionomer configurations, may also be used to form an electroactive frame of the flexible display. In an embodiment, the actuator 22 is an electric motor and spindle coupled with the display 20.

The actuator 22 is powered by a power supply 28. The power supply 28 may be any power supply operable to provide the motive energy for the actuator 22. For example common batteries may be used. The power provided by the power supply may be controlled by the actuator 22 as a request for power, or directly by the processor 16 as an actuation control of the actuator 22. The power supply 28 may also power the display.

The processor 16 operates pursuant to instructions. The instructions and/or transaction data for creating the map are stored in a non-transitory computer readable memory such as an external storage, ROM, and/or RAM. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method acts depicted in the accompanying figures may be implemented in software, the actual connections between the system components (or the process steps) may differ depending upon the manner of programming.

The instructions may be operable to cause the processor 16 to detect a tensing of a body with a first sensor 12, the first sensor attached to a coupler and disposed so as to register with a surface of the body. The instructions may also be operable to cause the processor 16 to determine that the coupler is at a specific orientation with a second sensor 14. The instructions may also be operable to cause the processor 16 to extend, in response to the detected tensing of the body and determined specific orientation of the coupler, a flexible display screen of a display assembly 20 linearly away from the coupler exposing a visible display area of the screen.

The same or different computer readable media may be used for the instructions, the detecting, and the sensor data storage. The sensor 12, 13, 14 data are stored in an external storage, but may be in other memories. The storage is internal to the processor 16 (e.g. cache). The external storage may be implemented on one or more additional computer systems. For example, the external storage may include a separate computer system, such as a mobile computing system, or any other now known or later developed storage system. The sensor data may be distributed among multiple storage devices.

The processor 16 has any suitable architecture, such as a general processor, central processing unit, digital signal processor, application specific integrated circuit, field programmable gate array, digital circuit, analog circuit, combinations thereof, or any other now known or later developed device for processing data. Likewise, processing strategies may include multiprocessing, multitasking, parallel processing, and the like. A program may be uploaded to, and executed by, the processor. The processor implements the program alone or includes multiple processors in a network or system for parallel or sequential processing.

In the arrangement of FIG. 8, the processor 16 and the sensors 12, 13, 14 communicate through one or more networks, internal bus, or other communication techniques. Wired and/or wireless communications are used. Further, the processor 16 may also communicate with external computing systems through one or more networks. For example, the processor 16 may receive data to display on the flexible display from an external device such as a smart phone or other mobile computing device. The networks may be local area, wide area, public, private, enterprise, or other networks. Any communication format may be used, such as e-mail, text, or TCP/IP. Direct or indirect communication is provided. The communications may or may not be secured, such as using a public key infrastructure. Alternatively, the communication is by manual data transfer, such as using a memory stick.

It is to be understood that the present embodiments may be implemented in various forms of hardware, software, firmware, special purpose processors, or a combination thereof. Preferably, the present embodiments are implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps may be implemented in software, the actual connections between the system components (or the process steps) may differ depending upon the manner in which the present invention is programmed.

While this invention has been described in conjunction with the specific embodiments outlined above, it is evident that many alternatives, modifications, and variations will be apparent o those skilled in the art. Accordingly, the preferred embodiments of the invention as set forth above are intended to be illustrative, not limiting. A variety of modifications to the embodiments described will be apparent to those skilled in the art from the disclosure provided herein. Thus, the present invention may be embodied in other specific forms without departing from the spirit or essential attributes thereof.

I claim:

1. An apparatus comprising:
a coupler configured to attach to a forearm of a user;
a first sensor disposed on the coupler so as to sense a surface of the forearm, the first sensor configured to detect a tensing of the forearm;
a second sensor configured to determine an orientation of the coupler; and
a screen assembly attached to the coupler, the screen assembly comprising:
a flexible display screen,
a core around which the flexible screen display screen is wound in a stored configuration, and
an actuator configured to un-store the flexible screen display, exposing a visible screen display area in response to signals from the first sensor and the second sensor.

2. The apparatus of claim 1, wherein the coupler is configured to attach to a wrist band.

3. The apparatus of claim 2, wherein the coupler is configured so as to be attached in multiple positions relative to the wrist band.

4. The apparatus of claim 3, wherein the coupler is configured to be rotatable between two positions relative to the wrist band.

5. The apparatus of claim 3, wherein the first sensor comprises at least one strain gauge configured to detect the tensing of the anterior of the forearm of the user.

6. The apparatus of claim 3, wherein the first sensor comprises at least one electric current sensor configured to detect electric current indicative of the tensing of the anterior of the forearm of the user.

7. The apparatus of claim 1, wherein the actuator comprises an electroactive material forming a frame for the flexible display screen.

8. The apparatus of claim 7, wherein the electroactive material is a polymer film or an ionic polymer metal composite.

9. The apparatus of claim 7, wherein the electroactive material is configured to un-store the flexible screen display into a flat configuration when charged with a first polarity.

10. The apparatus of claim 9, wherein the electroactive material is configured to re-wind the flexible screen display around the core when charged with a second polarity opposite the first polarity.

11. The apparatus of claim 1, wherein the screen assembly further comprises:
a spring coupled with the actuator, the spring configured to re-wind the flexible display into the stored position using a first force, and wherein the actuator is configured to un-store the display using a second force, the second force greater than the first force.

12. The apparatus of claim 1, wherein the flexible display screen comprises an electroluminance film.

13. The apparatus of claim 1, wherein the screen assembly further comprises a manual switch configured to override the signals from the first sensor and the second sensor and cause the actuator to un-store the flexible display screen.

14. The apparatus of claim 1, further comprising:
an enclosure containing the screen assembly and comprising a door through which the flexible screen display extends when the flexible screen display is un-stored by the actuator.

15. The apparatus of claim 1, further comprising:
a third sensor configured to detect motion of the forearm, and
wherein the actuator is further configured to unstore the flexible screen in response to signals from the first sensor, the second sensor, and the third sensor.

16. A method comprising:
detecting a tensing of a body with a first sensor, the first sensor attached to a coupler and disposed so as to register with a surface of the body;
determining that the coupler is at a specific orientation with a second sensor; and extending, in response to the detected tensing of the body and determined specific orientation of the coupler, a flexible display screen away from the coupler exposing a visible display area of the screen.

17. The method of claim 16, further comprising:

determining a motion of the body, and wherein the extending further comprises extending a flexible display screen in response to the detected tensing of the body, the determined orientation of the coupler, and the determined motion of the body.

18. The method of claim 17, wherein determining the motion of the body comprises establishing a lack of motion of the body, and wherein the extending further comprises extending a flexible display screen in response to the detected tensing of the body, the determined orientation of the coupler, and the established lack of motion of the body.

19. The method of claim 16, wherein the extending in response to the detected tensing of the body and determined orientation of the coupler comprises extending when both a particular orientation of the coupler is determined, and the tensing of the body is detected, for a pre-determined period of time.

20. A system comprising
- a first sensor disposed so as to sense a surface of a body, the first sensor configured to detect a tensing of the body;
- a second sensor configured to determine an orientation of the body;
- a flexible display screen configured to be hidden in a stored configuration and visible so as to expose a visible screen display area of the flexible display screen in an un-stored configuration, and
- an actuator configured to cause the flexible display screen to transition between the stored configuration and the un-stored configuration based on signals from the first sensor and second sensor.

* * * * *